US008641490B2

(12) United States Patent
Eisenhour (10) Patent No.: US 8,641,490 B2
(45) Date of Patent: Feb. 4, 2014

(54) VEHICLE AIR RECIRCULATION CONTROL DEVICE

(75) Inventor: Ronald S Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 1794 days.

(21) Appl. No.: 11/697,959

(22) Filed: Apr. 9, 2007

(65) Prior Publication Data
US 2008/0245504 A1 Oct. 9, 2008

(51) Int. Cl.
*B60H 3/00* (2006.01)

(52) U.S. Cl.
USPC .......................................... 454/139

(58) Field of Classification Search
USPC .......................................... 454/139
See application file for complete search history.

(56) References Cited

U.S. PATENT DOCUMENTS

| 6,079,218 A | 6/2000 | Ueda |
| 2003/0140642 A1 | 7/2003 | Quilliard et al. |
| 2003/0145612 A1* | 8/2003 | Huang et al. ................. 62/176.6 |
| 2005/0267646 A1* | 12/2005 | Ichishi et al. ................. 700/300 |
| 2006/0048531 A1 | 3/2006 | Eisenhour |
| 2006/0118290 A1* | 6/2006 | Klassen et al. ................. 165/202 |

* cited by examiner

*Primary Examiner* — Steven B McAllister
*Assistant Examiner* — Samantha Miller
(74) *Attorney, Agent, or Firm* — Global IP Counselors, LLP (57) ABSTRACT

An air recirculation control system is basically provided with a thermal sensing arrangement, a blower speed sensing arrangement, a recirculation door actuator and a control device. The thermal sensing arrangement detects a prescribed temperature condition. The blower speed sensing arrangement provides a prescribed blower signal indicative of a prescribed blower speed condition. The recirculation door actuator operates a recirculation door. The control device selectively activates the recirculation door actuator to switch between a normal air intake mode and a recirculation override mode based on the prescribed temperature condition detected by the thermal sensing arrangement and the prescribed blower signal received from the blower speed sensing arrangement.

18 Claims, 7 Drawing Sheets

| | Thermal Switch | T1 | T2 | T3 | T4 |
|---|---|---|---|---|---|
| Air Recirculation Override Mode | Open | ON | OFF | ON | ON |
| Normal Air Mode | Closed | OFF | ON | OFF | ON |

Heater Recirculation Circuit With Blower Speed at Med-High or High

Fig. 4

| | Thermal Switch | T1a | T2a | T3a | T4a |
|---|---|---|---|---|---|
| Air Recirculation Override Mode | Closed | ON | OFF | ON | ON |
| Normal Air Mode | Open | OFF | ON | OFF | ON |

A/C Recirculation Circuit With
Blower Speed at Med-High or High and A/C Switch On

| | Thermal Switch | T1 | T2 | T3 | T4 |
|---|---|---|---|---|---|
| Air Recirculation Override Mode | Open | ON | OFF | ON | ON |
| Normal Air Mode | Closed | OFF | ON | OFF | ON |

Heater Recirculation Circuit With Blower Speed at Med-High or High

| | Thermal Switch | T1a | T2a | T3a | T4a |
|---|---|---|---|---|---|
| Air Recirculation Override Mode | Closed | OFF | ON | ON | ON |
| Normal Air Mode | Open | ON | OFF | OFF | ON |

A/C Recirculation Circuit With Blower Speed at Med-High or High and A/C Switch On

Fig. 7

VEHICLE AIR RECIRCULATION CONTROL DEVICE

BACKGROUND OF THE INVENTION

1. Field of the Invention

The present invention generally relates to controlling the air flow into a vehicle. More specifically, the present invention relates to automatic switching from a fresh air mode to a recirculation mode.

2. Background Information

Most vehicles include a climate control system which allows a passenger of the vehicle to switch between a fresh air mode and a recirculation mode. In the fresh air mode, a fresh air vent is opened to introduce fresh air into the vehicle. In the recirculation mode, the fresh air vent is closed and the air within the vehicle is recirculated. Recirculation provides a climate control capacity advantage in that the cabin temperature is less extreme than the outside conditions. For example in heating conditions, it is much easier to deliver warm air from a heater using 0° C. air from within the cabin than −40° C. outside air. In cooling conditions, it is easier to cool 25° C. air from within the cabin than +40° C. outside air. Thus, when the driver first starts up the vehicle on a very hot day or a very cold day, the driver may set the controls to a recirculation mode to warm up or cool-down the cabin at a faster rate than if outside air was utilized.

In view of the above, it will be apparent to those skilled in the art from this disclosure that there exists a need for an improved vehicle air recirculation control device. This invention addresses this need in the art as well as other needs, which will become apparent to those skilled in the art from this disclosure.

SUMMARY OF THE INVENTION

One object of the present invention is to provide a climate control system with an automatic air recirculation mode that occurs one per ignition cycle when prescribed conditions are met.

In accordance with one aspect of the present invention, an air recirculation control system is provided that basically comprises a thermal sensing arrangement, a blower speed sensing arrangement, a recirculation door actuator and a control device. The thermal sensing arrangement is configured to detect a prescribed temperature condition. The blower speed sensing arrangement is configured to provide a prescribed blower signal indicative of a prescribed blower speed condition. The recirculation door actuator is configured to operate a recirculation door. The control device is operatively connected to the thermal sensing arrangement, the blower speed sensing arrangement and the recirculation door actuator. The control device is configured to selectively activate the recirculation door actuator to switch between a normal air intake mode and a recirculation override mode based on the prescribed temperature condition detected by the thermal sensing arrangement and the prescribed blower signal received from the blower speed sensing arrangement.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
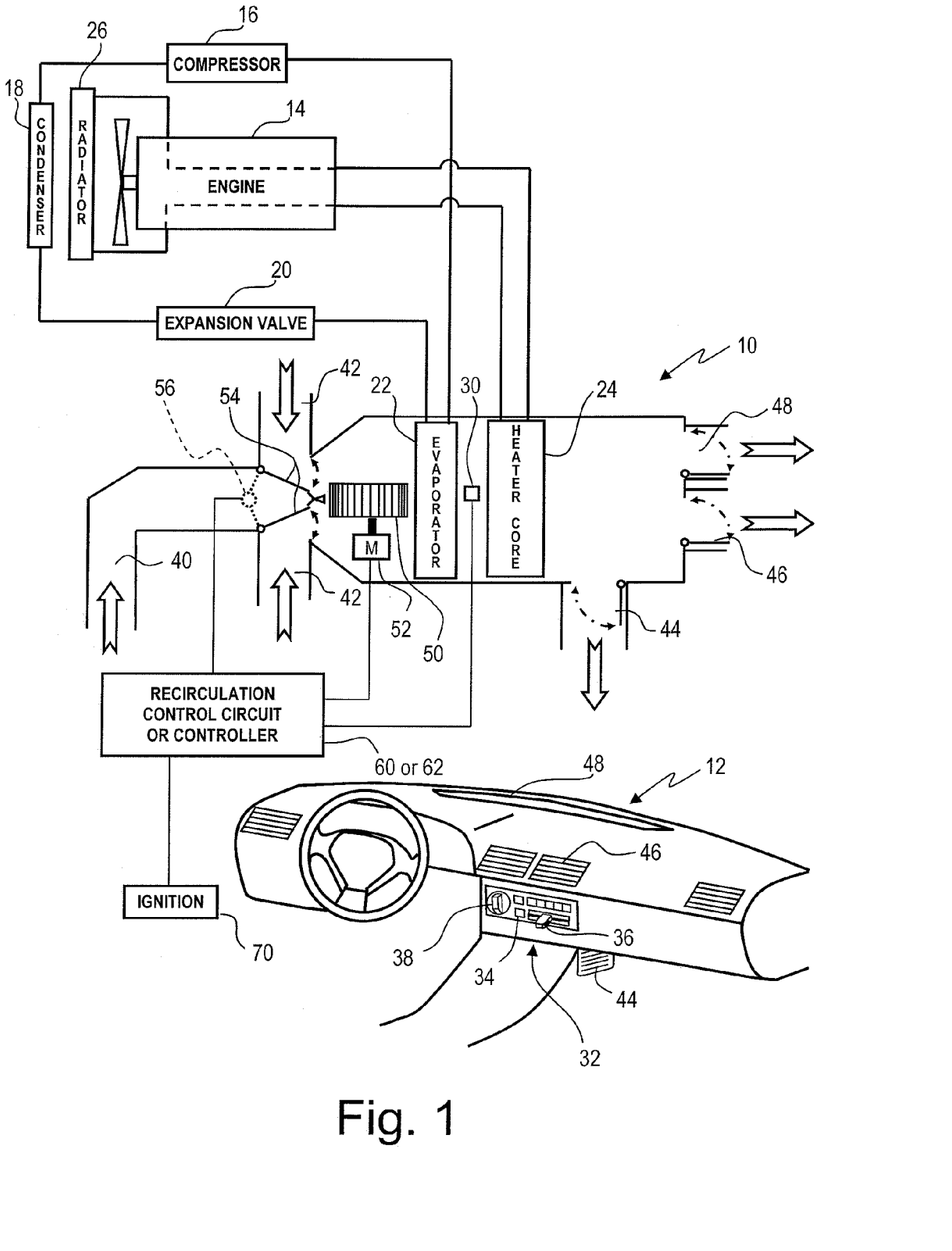
FIG. 1 is an overall schematic diagram of a vehicle equipped with a vehicle air recirculation control device in accordance with the present invention.

Referring initially to FIG. 1, an overall schematic diagram of a vehicle air recirculation control device 10 is illustrated that is installed in a vehicle 12 equipped with a climate control system in accordance with one preferred embodiment of the present invention. Basically, the main components relating to the climate control system includes, among other things, an engine 14, a compressor 16, a condenser 18, an expansion valve or orifice 20, an evaporator 22, a heater core 24 and a radiator 26. The components 14, 16, 18, 20, 22, 24 and 26 constitute a refrigerant circuit for the air conditioner of the vehicle 12. The engine 14, the heater core 24 and the radiator 26 constitutes a heater circuit for the heater of the vehicle 12. These components 14, 16, 18, 20, 22, 24 and 26 are conventional components that are well known in vehicles. Since these components 14, 16, 18, 20, 22, 24 and 26 are well known, the structures of the components 16, 18, 20 and 22 will not be discussed or illustrated in detail herein.

The compressor 16 is fluidly connected to the condenser 18 via a refrigerant pipe or conduit. The condenser 18 is located in front of the radiator 26 that cools the engine coolant of the engine 14. The evaporator 22 is also fluidly connected to the compressor 16 via a refrigerant pipe or conduit. The expansion valve 20 is fluidly connected to the condenser 18 via a refrigerant pipe or conduit, and to the evaporator 22 by a refrigerant pipe or conduit. Thus, a refrigerant (e.g., Freon, R134a) is circulated through the refrigerant circuit of the air conditioner to cool the passenger compartment or vehicle cabin.

In particular, the compressor 16 receives and compresses a cool vapor-phase refrigerant from the evaporator 22. The compressor 16 is preferably turned "on" and "off" by selectively energizing and de-energizing the electromagnetic clutch of the compressor 16 to adjust the temperature and pressure of the evaporator 22. In particular, a thermal switch 30 is disposed at the evaporator 22 to sense the temperature of the evaporator 22 such that the thermal switch 30 selectively turns the compressor 16 "on" and "off" depending on the temperature of the evaporator 22. In the illustrated embodiment, the thermal switch 30 opens when the temperature of the evaporator 22 is below a prescribed temperature T1 (e.g., about 0° C.) and closes when the temperature of the evaporator 22 is above a prescribed temperature T2 (e.g., about 3° C.). When the thermal switch 30 opens, a control circuit of the compressor 16 is opened to deactivate the compressor 16 and to avoid forming ice on the evaporator 22. When the thermal switch 30 closes, the control circuit of the compressor 16 is grounded to activate the compressor 16. In this way, the compressor 16 is cycled "on" and "off" to maintain the selected cabin temperature when the air conditioner is operating. Also operation of the compressor 16 to maintain the evaporator temperatures at these temperatures is effective in preventing window fogging, since humidity can be condensed from the air stream entering the cabin. Thus, the thermal switch 30 is a thermal sensing arrangement configured to detect a prescribed temperature condition (e.g. a prescribed temperature conditions corresponding to the opening and closing of the switch 30. As explained later, the thermal switch 30 also constitutes a part of the vehicle air recirculation control device 10 is also used to control the The engine 14, the heater core 24 and the radiator 26 are all fluidly connected such that heat from the engine 14 is transferred to the cabin by the heater core 24 in a conventional manner. Thus, as the engine 14 warms up, the heater core 24 is also warmed up.

As seen in FIG. 1, the operations of the climate control system are controlled by a set of operator controls 32 that are located in the cabin of the vehicle. The operator controls 32 typically will include an A/C "on/off" switch 34, a temperature control 36 and a blower of fan speed control 38. The climate control system also has an air duct system with a fresh air duct 40, a pair of recirculation ducts 42, a floor duct 44, a main duct 46 and a defrost duct 48. The evaporator 22 and the heater core 24 are disposed in the air duct system downstream of a blower 50 that is operated by a motor 52. The blower 50 is located downstream of the fresh air duct 40 and the recirculation ducts 42. The fresh air duct 40 and the recirculation ducts 42 are alternately opened and closed by a pair of recirculation doors 54. The recirculation doors 54 are opened and closed by a recirculation door actuator 56.

The operations of climate control systems are well known, and thus only the automatic control of switching between a fresh air mode and a recirculation mode by the vehicle air recirculation control device 10 will be discussed in accordance with the present invention. In the present invention, the vehicle air recirculation control device 10 automatically switches between a fresh air mode and a recirculation mode once per ignition cycle if certain prescribed conditions are met. In the case of an automatic climate control system, once the passenger operates one of the controls, control signals are received by a controller 60 to determine if the prescribed conditions are met to switch from the fresh air mode to the recirculation mode. In the case of a manual climate control system, once the passenger operates one of the controls, a circuit 62 is used to determine if the prescribed conditions are met to switch from the fresh air mode to the recirculation mode.

The controller 60 preferably includes a microcomputer with a control program that controls the recirculation door actuator 56 as discussed below. The controller 60 includes other conventional components such as an input interface circuit, an output interface circuit, and storage devices such as a ROM (Read Only Memory) device and a RAM (Random Access Memory) device. The microcomputer of the controller 60 is at least programmed to control the recirculation door actuator 56 in accordance with the flow charts of FIGS. 2 and 3. It will be apparent to those skilled in the art from this disclosure that the precise structure and algorithms for the controller 60 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Generally speaking either case, the controller 60 or the recirculation control circuit 62 is operatively connected to a thermal sensing arrangement (e.g., the thermal switch 30) that detects a prescribed temperature condition and a blower speed sensing arrangement (e.g., the hot side of the blower terminal of blower 50) that provides a prescribed blower signal (e.g., a prescribed voltage) indicative of a prescribed blower speed condition. The vehicle air recirculation control device 10 (i.e., the controller 60 or the recirculation control circuit 62) then selectively activate the recirculation door actuator 56 to switch between a normal air intake mode (i.e., the passenger's selection of either the fresh mode or the recirculation mode) and a recirculation override mode based on the prescribed temperature condition detected by the thermal sensing arrangement and the prescribed blower signal received from the blower speed sensing arrangement. The vehicle air recirculation control device 10 (i.e., the controller 60 or the recirculation control circuit 62) is further configured to activate the recirculation door actuator 56 to achieve the recirculation override mode only once during an ignition cycle after the ignition switch 70 is turned on and before the ignition switch 70 is subsequently turned off.

Figure 2:
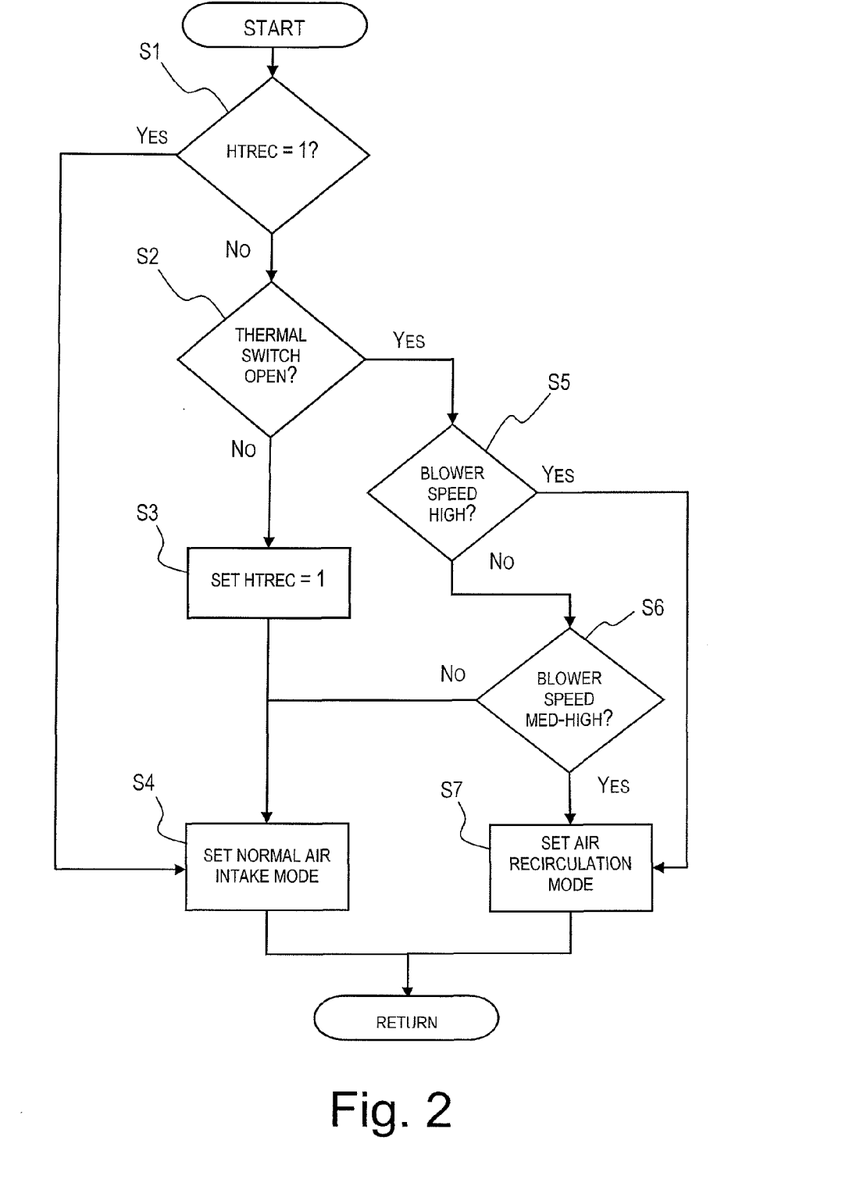
FIG. 2 is a flow chart of a recirculation control process that is performed by a controller or a recirculation control circuit when the outside air temperature is below a prescribed temperature, e.g., the thermal switch is open.
Figure 3:
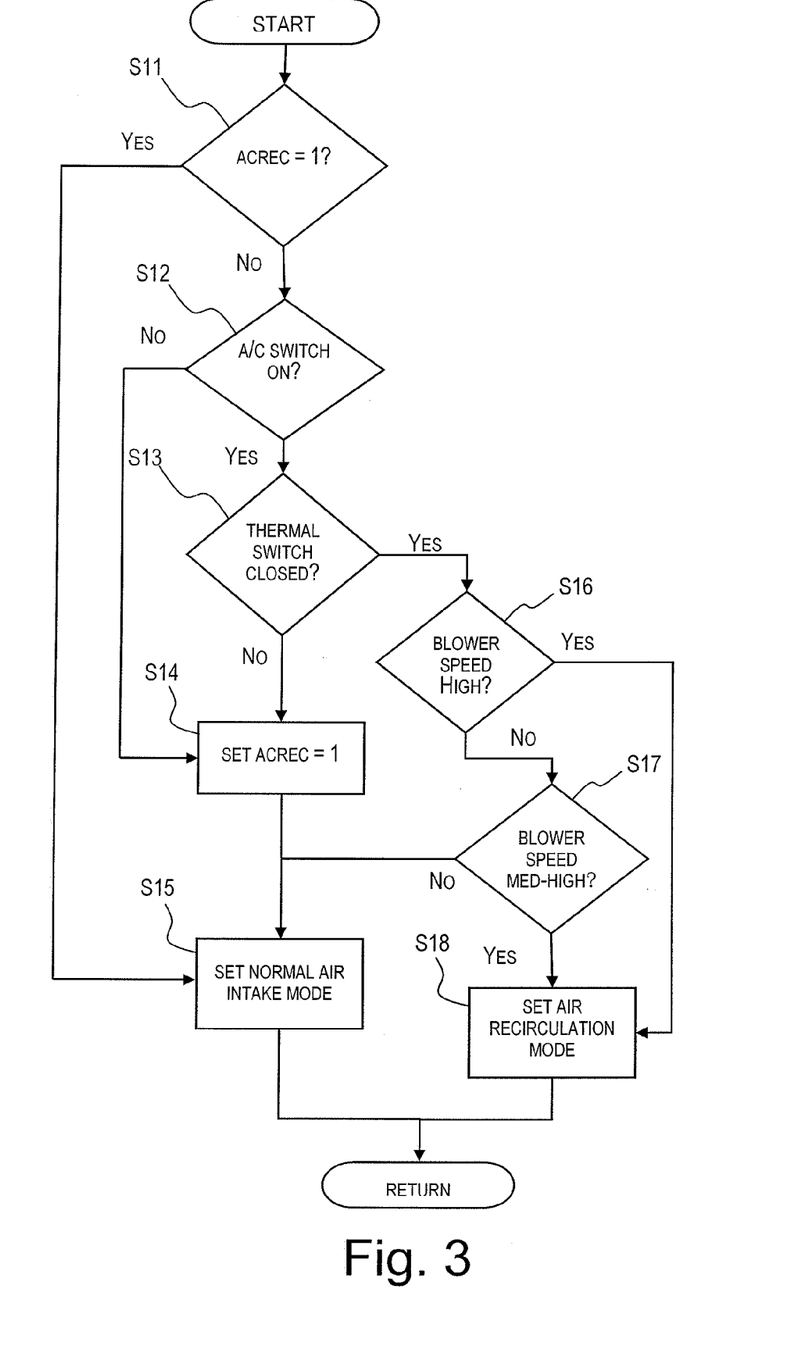
FIG. 3 is a flow chart of a recirculation control process that is performed by a controller or a recirculation control circuit when the outside air temperature is above a prescribed temperature, e.g., the thermal switch is closed.

First, the overall logic of the vehicle air recirculation control device 10 will be discussed with reference to FIGS. 2 and 3. This logic is used whether the controller 60 is utilized or whether the recirculation control circuit 62 is utilized. In particular, FIG. 2 is a flow chart of a recirculation control process that is performed by the controller 60 or the recirculation control circuit 62 when the outside air temperature is below a prescribed temperature, e.g., the thermal switch is open. FIG. 3 is a flow chart of a recirculation control process that is performed by the controller 60 or the recirculation control circuit 62 when the outside air temperature is above a prescribed temperature, e.g., the thermal switch is closed. Thus, the logic of the flow chart of FIG. 2 provides for enhanced heating of the vehicle cabin, while the logic of the flow chart of FIG. 2 provides for enhanced cooling of the vehicle cabin. The logic of the flow charts of FIGS. 2 and 3 are conducted each time an ignition switch 70 is turned on. When the ignition switch 70 is turned "on", in the flow charts of FIGS. 2 and 3, a heat recirculation flag HTREC and an A/C recirculation flag ACREC are initialized to zero. In other words, the recirculation flag HTREC and the A/C recirculation flag ACREC are initialized to zero each time the vehicle is started. As explained below, the controller 60 or the recirculation control circuit 62 selectively activates the recirculation door actuator 56 to achieve the recirculation override mode when the thermal sensor 30 detects a first temperature condition after the ignition switch 70 has been turned "on".

In step S1 of the flow chart of FIG. 2, the vehicle air recirculation control device 10 checks the status of the heat recirculation flag HTREC. If the heat recirculation flag HTREC is not equal to one (e.g., HTREC≠1), then the process proceeds to step S2.

In step S2, the vehicle air recirculation control device 10 checks the status of the thermal switch 30. If the thermal switch 30 is closed (i.e., the temperature of the evaporator 22 is above the prescribed temperature T2 such as about 3° C.), then the process proceeds to step S3.

In step S3, the vehicle air recirculation control device 10 sets the heat recirculation flag HTREC to one (e.g., HTREC=1), and then the process proceeds to step S4, where normal air intake mode is set (i.e., the passenger's selection of either the fresh mode or the recirculation mode is restored). Now, the process returns to step S1.

In step S1, if the heat recirculation flag HTREC is now equal to one (e.g., HTREC=1), then the process skips steps S2 and S3 and then proceeds directly to step S4. However, if the heat recirculation flag HTREC is not equal to one (e.g., HTREC≠1), then the process proceeds to step S2.

In step S2, if the thermal switch 30 is determined to be open (i.e., the temperature of the evaporator 22 is below the prescribed temperature T1 such as about 0° C.), then the process proceeds to step S5.

In step S5, the vehicle air recirculation control device 10 determines if the blower speed of the blower 50 is operating at a high speed. If the blower 50 is not operating at a high speed, then the process proceeds to step S6.

In step S6, the vehicle air recirculation control device 10 determines if the blower speed of the blower 50 is operating at a medium high speed. If the blower 50 is not operating at a medium high speed, then the process proceeds to step S4, where normal air intake mode is set (i.e., the passenger's selection of either the fresh mode or the recirculation mode is restored).

However, if the vehicle air recirculation control device 10 determines if the blower speed of the blower 50 is operating at a high speed (step S5) or at a medium high speed (step S6), then the process proceeds to step S7, where the recirculation mode is set. In other words, the recirculation door actuator 56 operated the recirculation doors 54 to close off the fresh air duct 40 and open the recirculation ducts 42.

Thus, with the logic of the flow chart of FIG. 2, it is possible to override the normal air intake mode and set a recirculation mode once per ignition cycle when the evaporator is cold (i.e., thermal switch 30 is open) and either a high blower speed or a medium high blower speed is selected. Once the evaporator warms enough to close the thermal switch 30, the recirculation mode override is disabled. In this way, window fogging is avoided (evaporator 22 is around 0° C. maximum) while enhancing heater performance for coolant warm up and outlet temperature achievement.

In step S11 of the flow chart of FIG. 3, the vehicle air recirculation control device 10 checks the status of the A/C recirculation flag ACREC. If the A/C recirculation flag ACREC is not equal to one (e.g., ACREC≠1), then the process proceeds to step S2. In step S11, if the A/C recirculation flag ACREC is equal to one (e.g., ACREC=1), then the process skips steps S12 to S14 and then proceeds directly to step S15.

In step S12, the vehicle air recirculation control device 10 checks the status of the A/C "on/off" switch 34. If the A/C "on/off" switch 34 is "on", then the process proceeds to step S13. If the A/C "on/off" switch 34 is "off", then the process skips steps S12 to S14 and then proceeds directly to step S15.

In step S13, the vehicle air recirculation control device 10 checks the status of the thermal switch 30. If the thermal switch 30 is open (i.e., the temperature of the evaporator 22 is below the prescribed temperature T1 such as about 0° C.), then the process proceeds to step S14.

In step S14, the vehicle air recirculation control device 10 sets the A/C recirculation flag ACREC to one (e.g., ACREC=1), and then the process proceeds to step S15, where normal air intake mode is set (i.e., the passenger's selection of either the fresh mode or the recirculation mode is restored). Now, the process returns to step S11.

In step S13, if the thermal switch 30 is determined to be closed (i.e., the temperature of the evaporator 22 is above the prescribed temperature T2 such as about 3° C.), then the process proceeds to step S16.

In step S16, the vehicle air recirculation control device 10 determines if the blower speed of the blower 50 is operating at a high speed. If the blower 50 is not operating at a high speed, then the process proceeds to step S17.

In step S17, the vehicle air recirculation control device 10 determines if the blower speed of the blower 50 is operating at a medium high speed. If the blower 50 is not operating at a medium high speed, then the process proceeds to step S15, where normal air intake mode is set (i.e., the passenger's selection of either the fresh mode or the recirculation mode is restored).

However, if the vehicle air recirculation control device 10 determines if the blower speed of the blower 50 is operating at a high speed (step S16) or at a medium high speed (step S17), then the process proceeds to step S18, where the recirculation mode is set. In other words, the recirculation door actuator 56 operated the recirculation doors 54 to close off the fresh air duct 40 and open the recirculation ducts 42.

Thus, with the logic of the flow chart of FIG. 3, it is possible to override the normal air intake mode and set a recirculation mode once per ignition cycle when the evaporator is warm (i.e., thermal switch 30 is closed), the A/C "on/off" switch 34 is "on", and either a high blower speed or a medium high blower speed is selected. Once the evaporator cools enough to open the thermal switch 30, the recirculation mode override is disabled. In this way, cool-down performance is enhanced by using the recirculation mode.

Figure 4:
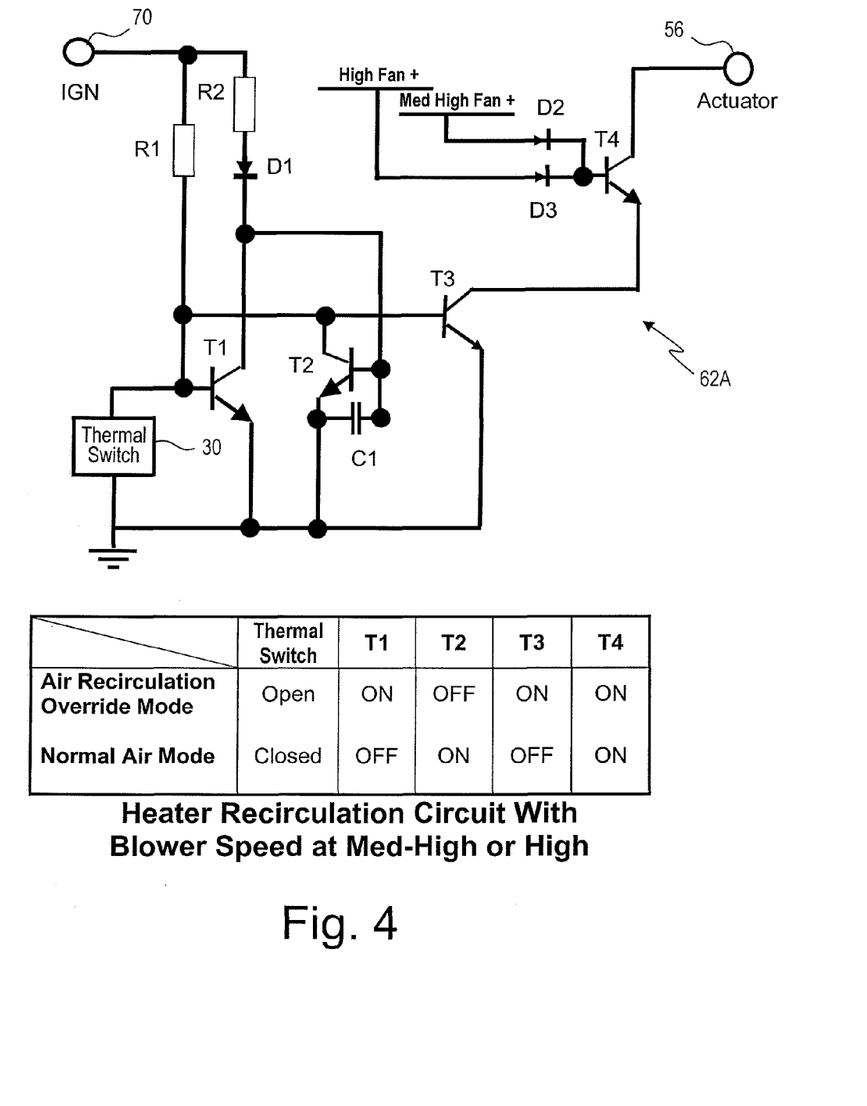
FIG. 4 is a schematic circuit diagram of the heater recirculation control circuit for a manually operated climate control system in accordance with the present invention.
Figure 5:
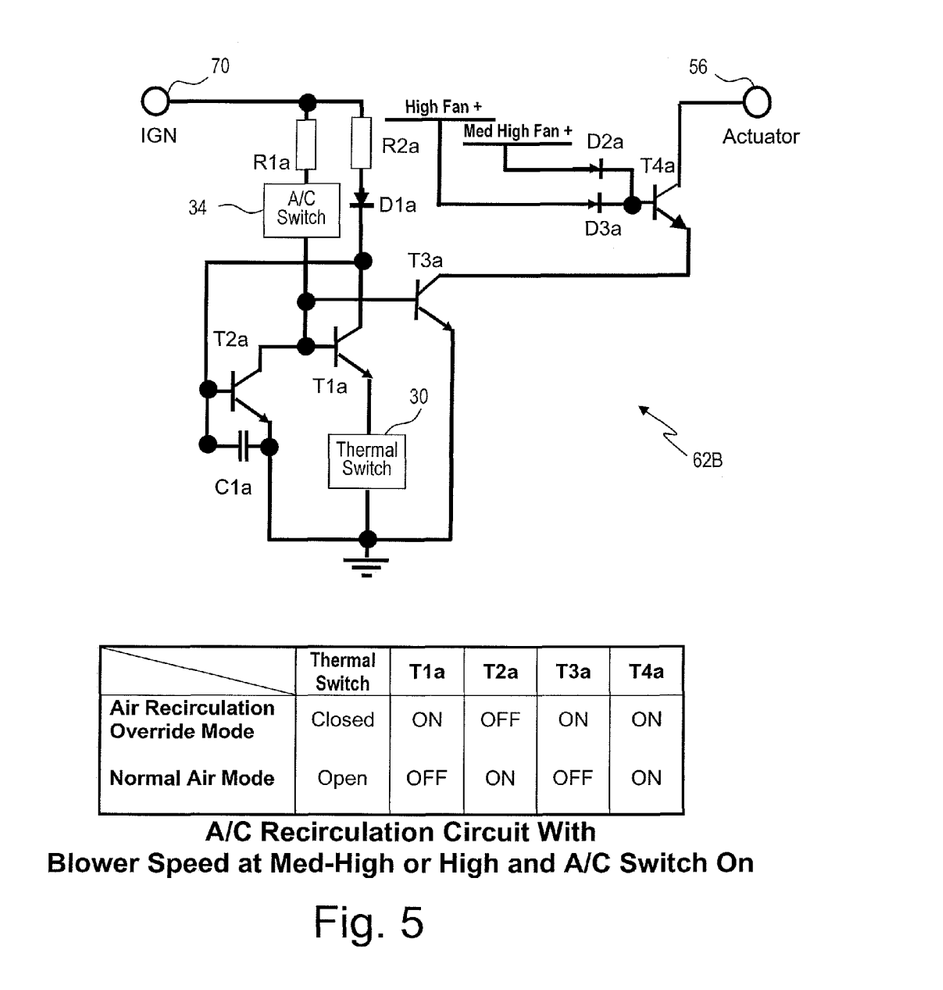
FIG. 5 is a schematic circuit diagram of the A/C recirculation control circuit for a manually operated climate control system in accordance with the present invention.
Figure 6:
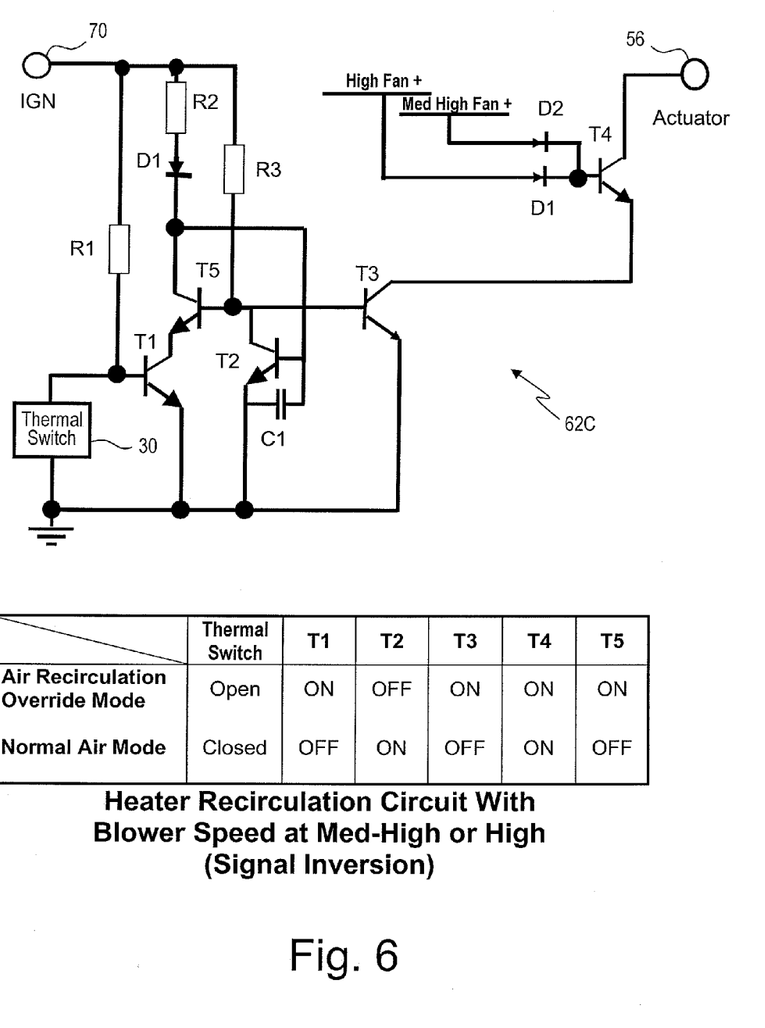
FIG. 6 is a schematic circuit diagram of a modified heater recirculation control circuit for a manually operated climate control system in accordance with the present invention.
Figure 7:
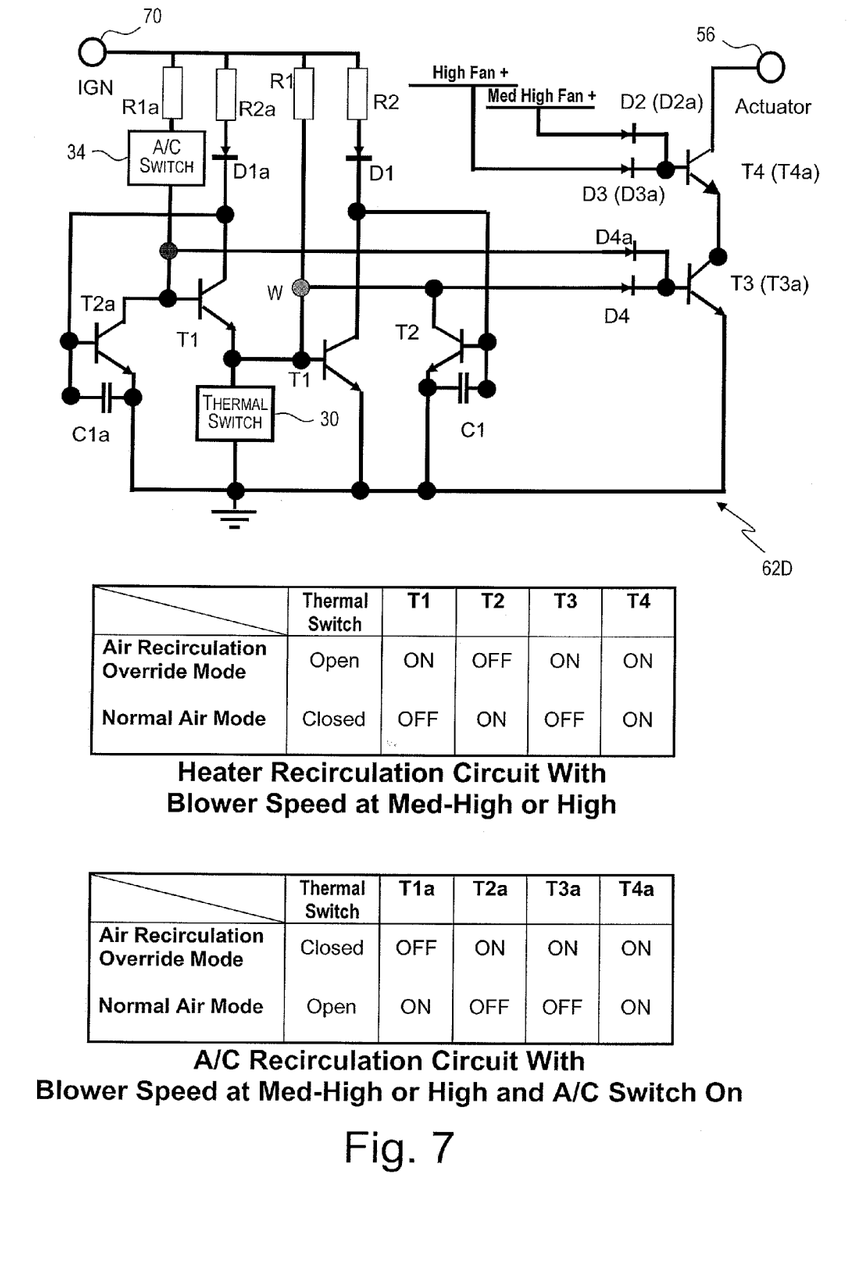
FIG. 7 is a schematic circuit diagram of the combined heater and A/C recirculation control circuit for a manually operated climate control system in accordance with the present invention.

Referring now to FIGS. 4 to 7, four preferred circuits are illustrated that can be used for the recirculation control circuit 62 to carry out various aspects of the present invention. FIG. 4 is a schematic circuit diagram of a heater recirculation control circuit 62A for a manually operated climate control system. FIG. 5 is a schematic circuit diagram of an A/C recirculation control circuit 62B for a manually operated climate control system. FIG. 6 is a schematic circuit diagram of a modified heater recirculation control circuit 62C for a manually operated climate control system. FIG. 7 is a schematic circuit diagram of a combined heater and A/C recirculation control circuit 62D for a manually operated climate control system.

Depending on the vehicle and the desired results, the vehicle can utilize only the heater recirculation control circuit or only the A/C recirculation control circuit, or both. In other words, the heater recirculation control circuit and the A/C recirculation control circuit can be separate circuits that are used independently of each other in a system or used together in one system. Alternatively, as seen in FIG. 7, the heater recirculation control circuit and the A/C recirculation control circuit can be combined together into a single circuit, e.g., combined heater and A/C recirculation control circuit 62D as needed and/or desired.

Preferably, the climate control is carried out without using a microprocessor or the like as in the case of the recirculation control circuit 62. However, the climate control can be carried out with a microprocessor (e.g., the controller 60) to perform the automatic operation of the recirculation door actuator 56 once per ignition cycle. Of course, by using a microprocessor instead of a control circuit such as those shown in FIGS. 4 to 7, the cost of the vehicle will increase. Thus, by using a control circuit such as those shown in FIGS. 4 to 7, a low cost solution is provided that can automatically operate the recirculation door actuator 56 once per ignition cycle without the cost of installing a microprocessor. Also if the vehicle is equipped with an air conditioning unit, then the present invention can utilize the thermal switch 30 that is used to operate the compressor 16 to also operate the recirculation door actuator 56.

In any event, the recirculation control circuits 62A, 62B and 62C selectively activate the recirculation door actuator 56 to switch between a normal air intake mode (i.e., the passenger's selection of either the fresh mode or the recirculation mode) and a recirculation override mode based on the prescribed temperature condition detected by the thermal sensing arrangement and the prescribed blower signal received from the blower speed sensing arrangement.

Basically, in each of the control circuits 62A, 62B, 62C and 62D, a power input terminal electrically connectable between a vehicle power source (e.g., a hot terminal side of the ignition switch 70), a ground terminal of the recirculation door actuator 56, a hot terminal side of the blower 50 and a vehicle ground.

As seen in FIG. 4, the heater recirculation control circuit 62A is electrically connected between a hot terminal side of the ignition switch 70 and a ground terminal of the recirculation door actuator 56. The heater recirculation control circuit 62A is also electrical connected to a hot terminal side of the blower 50 to monitor the blower speed. The heater recirculation control circuit 62A preferably includes the thermal switch 30 that is used to operate the compressor 16. Of course, a separate thermal switch could be provided for the heater recirculation control circuit 62A if needed and/or desired. Thus, in addition to the thermal switch 30, the heater recirculation control circuit basically, includes a pair of resistors R1 and R2, three diodes D1, D2 and D3 and four transistors T1, T2, T3 and T4.

In the heater recirculation control circuit 62A, the recirculation mode occurs once per ignition cycle when the thermal switch 30 is open and the blower 50 is set to either the medium high blower speed or high blower speed. Thus, when the ignition switch 70 is turned "on" and these conditions occur, current is supplied to the ignition terminal. The current flows through the resistors R1 and R2 and the diode D1 to the transistors T1, T2 and T3 and the thermal switch 30. Since the thermal switch 30 is open, sufficient base voltage is supplied to the transistor T1 to turn the transistor T1 "on" so that the current flows through the transistor T1. Meanwhile, because thermal switch 30 is open, sufficient base voltage is supplied to the transistor T3 to turn the transistor T3 "on" so that the current flows through the transistor T3. Since the transistors T1 and T3 are both "on", the capacitor C1 next to the transistor T2 is discharged by the current flowing through the transistor T1 which causes the voltage to drop at the transistor T2 so that the current does not flow through the transistor T2. Thus, the transistor T2 is turned "off". Also since the transistor T3 is "on" (i.e., sufficient base voltage), the current from the recirculation door actuator 56 is grounded so long as the transistor T4 is "on" from the blower 50 being set to either the medium high blower speed or high blower speed, which then supplies sufficient base voltage to the transistor T4 to turn "on". Accordingly, since the recirculation door actuator 56 is grounded, the recirculation door actuator 56 is activated to move the recirculation doors 54 to close the fresh air duct 40 and open the recirculation ducts 42.

In the heater recirculation control circuit 62A, the fresh air mode occurs when the thermal switch 30 is closed, or the blower 50 is set to either off, set to a low blower speed or set to a medium low blower speed. Thus, when the ignition switch 70 is turned on and these conditions occur, current is supplied to the ignition terminal. However, in this case since the thermal switch 30 is closed, the current passes through the thermal switch 30 to ground. By grounding the heater recirculation control circuit 62A in this way (i.e., closing the thermal switch 30, insufficient base voltage occurs at the transistor T1 so that the transistor T1 is turn "off". Since the thermal switch 30 is closed, insufficient base voltage also occurs at the transistor T3 so that the transistor T3 is also turn "off". With the transistors T1 and T3 being "off", the capacitor C1 next to the transistor T2 becomes fully charged which causes the voltage at the transistor T2 to increase above the required base voltage to turn the transistor T2 "on". Since the transistor T3 is "off" (i.e., insufficient base voltage), the current from the recirculation door actuator 56 cannot pass through the transistor T3 regardless of the state of the transistor T4 (i.e., regardless of speed of the blower 50). Moreover, once the capacitor C1 next to the transistor T2 becomes fully charged to turn the transistor T2 "on", the base voltage at the transistor T3 remains at a level so that the transistor T3 remains "off" (i.e., insufficient base voltage). Thus, the recirculation mode will not automatically reoccur in a single ignition cycle even if the thermal switch 30 is reopened during the single ignition cycle. Accordingly, since the recirculation door actuator 56 is no longer grounded, the recirculation door actuator 56 is deactivated to move the recirculation doors 54 to open the fresh air duct 40 and close the recirculation ducts 42.

Referring now to FIG. 5, in the A/C recirculation control circuit 62B, the recirculation mode occurs once per ignition cycle when the thermal switch 30 is closed, the A/C "on/off" switch 34 is closed (i.e., the A/C "on/off" switch 34 is "on") and the blower 50 is set to either the medium high blower speed or the high blower speed. Thus, when the ignition switch 70 is turned "on" and these conditions occur, current is supplied to the ignition terminal. The current flows through the resistors R1a and R2a and the diode D1a to the transistors T1a, T2a and T3a and the thermal switch 30. Since the base voltage at this point with A/C "on/off" switch 34 being closed (i.e., A/C is "on") is sufficient at the transistors T1a and T3a, the base voltage turns the transistors T1a and T3a "on". Also since the thermal switch 30 is closed, the current passing through the transistor T1a also passes through the thermal switch 30 to ground. The capacitor C1a next to the transistor T2a is discharged by the ground that is created by the thermal switch 30 being closed. The discharge of the capacitor C1a causes the base voltage at the transistor T2a to drop so that the transistor T2a is turned "off" and the current does not flow through the transistor T2a. Since the transistor T3a is "on", (i.e., sufficient base voltage), the current from the recirculation door actuator 56 is grounded so long as the transistor T4a is "on" from the blower 50 being set to either the medium high blower speed or high blower speed, which then supplies sufficient base voltage to the transistor T4a to turn "on". Accordingly, since the recirculation door actuator 56 is grounded, the recirculation door actuator 56 is activated to move the recirculation doors 54 to close the fresh air duct 40 and open the recirculation ducts 42.

In the A/C recirculation control circuit 62B, the fresh air mode occurs when the thermal switch 30 is open, or the A/C "on/off" switch 34 is open (i.e., the A/C "on/off" switch 34 is "on"), or the blower 50 is set to either off, set to a low blower speed or set to a medium low blower speed. Thus, when the ignition switch 70 is turned on, current is supplied to the ignition terminal. However, in the case that the A/C "on/off" switch 34 is open (i.e., A/C "off"), no base current is supplied to the transistor T3a and the recirculation door actuator 56 is not grounded. Accordingly, since the recirculation door actuator 56 is not grounded, the recirculation door actuator 56 is deactivated to move the recirculation doors 54 to open the fresh air duct 40 and close the recirculation ducts 42.

If the A/C "on/off" switch 34 is closed (i.e., A/C "on") and the thermal switch 30 is open, then sufficient base voltage occurs at the transistor T2a to turn the transistor T2a "on" so that the current flows through the transistor T2a. Since current flows through the transistor T2a, this causes a voltage drop at the transistors T1a and T3a so that both of the transistors T1a and T3a are "off" due to the insufficient base voltage. Thus, current does not flow through the transistors T1a and T3a. With the transistor T3a being "off" (i.e., insufficient base voltage), then the current from the recirculation door actuator 56 cannot pass through the transistor T3a regardless of the state of the transistor T4a (i.e., regardless of speed of the blower 50). Moreover, once the capacitor C1a next to the transistor T2a becomes fully charged to turn the transistor T2a "on", the base voltage at the transistor T3a remains at a level so that the transistor T3a remains "off" (i.e., insufficient base voltage). Thus, the recirculation mode will not automatically reoccur in a single ignition cycle even if the thermal switch 30 again closes during the single ignition cycle. Accordingly, since the recirculation door actuator 56 is no longer grounded, the recirculation door actuator 56 is deactivated to move the recirculation doors 54 to open the fresh air duct 40 and close the recirculation ducts 42.

Referring now to FIG. 6, the alternate heater recirculation control circuit 62C will now be discussed. For the sake of simplicity, the same reference symbols will be used in the circuit 62C that are used in the circuit 62A for corresponding components. In the heater recirculation control circuit 62C, the recirculation mode occurs once per ignition cycle when the thermal switch 30 is open and the blower 50 is set to either the medium high blower speed or high blower speed. Thus, when the ignition switch 70 is turned "on" and these conditions occur, current is supplied to the ignition terminal. The current flows through the resistors R1, R2 and R3 and the diode D1 to the transistors T1, T2, T3 and T5 and the thermal switch 30. Since the thermal switch 30 is open, sufficient base voltage is supplied to the transistor T1 to turn the transistor T1 "on" so that the current flows through the transistor T1. Meanwhile, base voltage is supplied to the transistor T5 to turn the transistor T5 "on" so that the current flows through the transistors T5 and T1 to ground. Since the transistors T1 and T5 are both "on", the capacitor C1 next to the transistor T2 is discharged by the current flowing through the transistor T1 which causes the voltage to drop at the transistor T2 so that the current does not flow through the transistor T2. Thus, the transistor T2 is turned "off". Meanwhile, the transistor T2 is turned "off", sufficient base voltage is supplied to the transistor T3 to turn the transistor T3 "on" so that the current flows through the transistor T3. Also since the transistor T3 is "on" (i.e., sufficient base voltage), the current from the recirculation door actuator 56 is grounded so long as the transistor T4 is "on" from the blower 50 being set to either the medium high blower speed or high blower speed, which then supplies sufficient base voltage to the transistor T4 to turn "on". Accordingly, since the recirculation door actuator 56 is grounded, the recirculation door actuator 56 is activated to move the recirculation doors 54 to close the fresh air duct 40 and open the recirculation ducts 42.

In the heater recirculation control circuit 62C, the fresh air mode occurs when the thermal switch 30 is closed, or the blower 50 is set to either off, set to a low blower speed or set to a medium low blower speed. Thus, when the ignition switch 70 is turned on and these conditions occur, current is supplied to the ignition terminal. However, in this case since the thermal switch 30 is closed, the current passes through the thermal switch 30 to ground. By grounding the heater recirculation control circuit 62C in this way (i.e., closing the thermal switch 30, insufficient base voltage occurs at the transistor T1 so that the transistor T1 is turn "off". Since the thermal switch 30 is closed, insufficient base voltage also occurs at the transistor T3 so that the transistor T3 is also turn "off". With the transistors T1 and T3 being "off", the capacitor C1 next to the transistor T2 becomes fully charged which causes the voltage at the transistor T2 to increase above the required base voltage to turn the transistor T2 "on". Since the transistor T3 is "off" (i.e., insufficient base voltage), the current from the recirculation door actuator 56 cannot pass through the transistor T3 regardless of the state of the transistor T4 (i.e., regardless of speed of the blower 50). Moreover, once the capacitor C1 next to the transistor T2 becomes fully charged to turn the transistor T2 "on", the base voltage at the transistor T3 remains at a level so that the transistor T3 remains "off" (i.e., insufficient base voltage). Thus, the recirculation mode will not automatically reoccur in a single ignition cycle even if the thermal switch 30 is reopened during the single ignition cycle. Accordingly, since the recirculation door actuator 56 is no longer grounded, the recirculation door actuator 56 is deactivated to move the recirculation doors 54 to open the fresh air duct 40 and close the recirculation ducts 42.

Referring now to FIG. 7, the combined heater and A/C recirculation control circuit 62D basically combines the circuits 62A and 62B together. Thus, for the sake of simplicity, the same reference symbols will be used in the circuit 62D that are used in the circuits 62A and 62B for corresponding components. The warm-up recirculation logic and the circuit operation is the same as discussed above with respect to the heater recirculation control circuit 62A, while the cool-down recirculation logic the circuit operation is the same as discussed above with respect to the A/C recirculation control circuit 62B. Thus, the combined heater and A/C recirculation control circuit 62D will not be discussed in detail herein.

In the above embodiments, the thermal switch 30 constitutes a thermal sensing arrangement configured to detect a prescribed temperature condition. The transistors T4 and T4a each constitutes a blower speed sensing arrangement configured to provide a prescribed blower signal indicative of a prescribed blower speed condition. The circuit 62 (e.g., circuits 62A, 62B, 62C and 62D) constitutes a control device operatively connected to the thermal sensing arrangement, the blower speed sensing arrangement and the recirculation door actuator 56. Also the controller 60, as seen in FIG. 1, constitutes a control device operatively connected to the thermal sensing arrangement, the blower speed sensing arrangement and the recirculation door actuator 56. Thus, the control device (controller 60 or circuit 62) is configured to selectively activate the recirculation door actuator to switch between a normal air intake mode and a recirculation override mode based on the prescribed temperature condition detected by the thermal sensing arrangement and the prescribed blower signal received from the blower speed sensing arrangement.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle air recirculation control device comprising:
    a thermal sensing arrangement configured to measure a temperature to detect existence of a prescribed temperature condition based on the measured temperature;
    a blower speed sensing arrangement configured to provide a prescribed blower signal indicative of a prescribed blower speed condition of a vehicle blower;
    a recirculation door actuator configured to operate a recirculation door to switch between a normal air intake mode and a recirculation override mode; and
    a control device operatively connected to the thermal sensing arrangement, the blower speed sensing arrangement and the recirculation door actuator,
    the control device being configured to selectively activate the recirculation door actuator to switch between the normal air intake mode and the recirculation override mode in response to the prescribed temperature condition being detected by the thermal sensing arrangement and the prescribed blower signal being received from the blower speed sensing arrangement,
    the control device being further configured to activate the recirculation door actuator to achieve the recirculation override mode in response to the blower speed sensing arrangement providing the prescribed blower signal indicative of the vehicle blower being operated above a prescribed speed.

2. The vehicle air recirculation control device according to claim 1, wherein
    the thermal sensing arrangement includes a thermal sensor configured and arranged to detect one of first and second temperature conditions according to the measured temperature.

3. The vehicle air recirculation control device according to claim 2, wherein
    the control device is further configured to selectively activate the recirculation door actuator to achieve the recirculation override mode when the thermal sensor detects the first temperature condition upon an ignition switch being turned on.

4. The vehicle air recirculation control device according to claim 3, wherein
    the control device is further configured to selectively activate the recirculation door actuator to switch from the recirculation override mode to the normal air intake mode when a detection result from the thermal sensor changes from the first temperature condition to the second temperature condition.

5. The vehicle air recirculation control device according to claim 3, wherein
    the control device is further configured to activate the recirculation door actuator to achieve the recirculation override mode only once during an ignition cycle after the ignition switch is turned on and before the ignition switch is subsequently turned off.

6. The vehicle air recirculation control device according to claim 2, wherein
    the thermal sensor is configured and arranged to detect the first temperature condition when the measured temperature is below a first prescribed temperature and to detect the second temperature condition when the measured temperature is above a second prescribed temperature that is larger that the first prescribed temperature.

7. The vehicle air recirculation control device according to claim 3, further comprising
    an A/C condition sensing section configured to provide one of an A/C on signal indicative of an A/C switch being turned on and an A/C off signal indicative of the A/C switch being turned off,
    the control device is further configured to selectively activate the recirculation door actuator to achieve the recirculation override mode when the control device receives the A/C on signal from the A/C condition sensing section.

8. The vehicle air recirculation control device according to claim 7, wherein
    the thermal sensor is configured and arranged to detect the second temperature condition when the measured temperature is below a first prescribed temperature and to detect the first temperature condition when the measured temperature is above a second prescribed temperature that is larger that the first prescribed temperature.

9. The vehicle air recirculation control device according to claim 1, wherein
    the blower speed sensing arrangement is further configured to provide a first speed signal indicative of a condition in which the vehicle blower is operated above the prescribed speed, and a second speed signal indicative of a condition in which the vehicle blower is operated below the prescribed speed.

10. The vehicle air recirculation control device according to claim 9, wherein
the control device is further configured to selectively activate the recirculation door actuator to achieve the recirculation override mode based on the first speed signal received from the blower speed sensing arrangement and to achieve the normal air intake mode based on the second speed signal received from the blower speed sensing arrangement.

11. The vehicle air recirculation control device according to claim 1, wherein
the control device includes a recirculation control circuit electrically connectable to selectively activate the recirculation door actuator.

12. The vehicle air recirculation control device according to claim 11, wherein
the recirculation control circuit includes a power input terminal electrically connectable between a vehicle power source and a ground;
the blower speed sensing arrangement is formed by a blower terminal of the recirculation control circuit that is electrically connectable to a blower power source of the vehicle blower for selectively providing a prescribed electric potential to the recirculation control circuit as the prescribed blower signal that is indicative of the prescribed blower speed condition in which the vehicle blower being is above the prescribed speed; and
the thermal sensing arrangement is formed by a thermal switch of the recirculation control circuit that is electrically connected to the power input terminal and being configured to change between an open state and a closed state based on temperature.

13. The vehicle air recirculation control device according to claim 12, wherein
the thermal switch is electrically connected to cycle "on" and "off" a compressor of an A/C refrigerant circuit.

14. The vehicle air recirculation control device according to claim 12, wherein
the recirculation control circuit is configured to selectively connect the recirculation door actuator to the ground for operating the recirculation door.

15. The vehicle air recirculation control device according to claim 12, wherein
the recirculation control circuit includes at least one electrical switch operatively connected between the vehicle power source and the ground with the at least one electrical switch and the thermal switch being arranged to operate the recirculation door actuator to the recirculation override mode when the thermal switch is in the open state due to the prescribed temperature condition being above a prescribed temperature.

16. The vehicle air recirculation control device according to claim 12, wherein
the recirculation control circuit includes an A/C switch electrically connected to the power input terminal to change the recirculation control circuit between an A/C on state to operate the recirculation door actuator to the recirculation override mode and an A/C off state to operate the recirculation door actuator to the normal air take mode; and
the recirculation control circuit includes at least one electrical switch operatively connected between the vehicle power source and the ground with the at least one electrical switch and the thermal switch being arranged to operate the recirculation door actuator to the recirculation override mode when the thermal switch is in the closed state due to the prescribed temperature condition being below a prescribed temperature.

17. The vehicle air recirculation control device according to claim 1, wherein
the control device includes a microprocessor to selectively activate the recirculation door actuator.

18. The vehicle air recirculation control device according to claim 1, wherein
the control device is further configured to selectively activate the recirculation door actuator to achieve the recirculation override mode such that the recirculation door blocks an air intake path from a heat exchanging path and opens an air recirculation path to the heat exchanging path.

* * * * *